US010890659B2

(12) United States Patent
Fucke et al.

(10) Patent No.: US 10,890,659 B2
(45) Date of Patent: Jan. 12, 2021

(54) LIGHT-WEIGHT RADAR SYSTEM

(71) Applicant: The Boeing Company, Chicago, IL (US)

(72) Inventors: Lars Fucke, Zeuther (DE); Grzegorz Marian Kawiecki, Madrid (ES)

(73) Assignee: THE BOEING COMPANY, Chicago, IL (US)

(*) Notice: Subject to any disclaimer, the term of this patent is extended or adjusted under 35 U.S.C. 154(b) by 305 days.

(21) Appl. No.: 15/910,004

(22) Filed: Mar. 1, 2018

(65) Prior Publication Data
US 2019/0196007 A1 Jun. 27, 2019

(30) Foreign Application Priority Data

Dec. 21, 2017 (ES) .................... 17382878

(51) Int. Cl.
G01S 13/935 (2020.01)
G01S 7/285 (2006.01)
G01S 13/931 (2020.01)
G01S 13/933 (2020.01)
G01S 7/41 (2006.01)
G01S 13/00 (2006.01)
G01S 13/90 (2006.01)
G01S 13/02 (2006.01)
G01S 7/02 (2006.01)

(52) U.S. Cl.
CPC ............ G01S 13/935 (2020.01); G01S 7/285 (2013.01); G01S 7/41 (2013.01); G01S 13/003 (2013.01); G01S 13/90 (2013.01); G01S 13/931 (2013.01); G01S 13/933 (2020.01); G01S 2007/028 (2013.01); G01S 2013/0245 (2013.01)

(58) Field of Classification Search
CPC ........ G08G 5/045; G08G 5/0069; G01S 7/41; G01S 7/411; G01S 7/412; G01S 13/931; G01S 13/933; G01S 13/935
See application file for complete search history.

(56) References Cited

U.S. PATENT DOCUMENTS 9,110,170 B1 * 8/2015 Woollard ................ G01S 13/89
9,302,782 B2 * 4/2016 Frolov ............... H04B 7/18506
9,489,852 B1 * 11/2016 Chambers ............ G08G 5/0034
(Continued)

FOREIGN PATENT DOCUMENTS

CN   105717504 A   6/2016
CN   105974936 A   9/2016

OTHER PUBLICATIONS

European Search Report dated Jul. 20, 2018 in the corresponding EP Application No. EP17382878.1, 4 pages.
(Continued)

Primary Examiner — Peter M Bythrow
(74) Attorney, Agent, or Firm — Moore IP Law

(57) ABSTRACT

Disclosed is a light-weight radar system ("LWRS") for sense and avoid applications in a vehicle. The LWRS includes a plurality of receivers, a plurality of transmitters, an obstacle database, and a processing device. The processing device is in signal communication with the plurality of receivers, plurality of transmitters, and the obstacle database. The processing device includes at least one processor and a computer computer-readable medium ("CRM") having encoded thereon computer-executable instructions.

20 Claims, 10 Drawing Sheets

(56) References Cited

U.S. PATENT DOCUMENTS

| | | | | |
|---|---|---|---|---|
| 10,042,045 B2* | 8/2018 | Kirino | ................... | G01S 13/931 |
| 10,332,405 B2* | 6/2019 | Kopardekar | ........... | G08G 5/006 |
| 10,353,388 B2* | 7/2019 | Schubert | ............. | G08G 5/0013 |
| 10,372,142 B2* | 8/2019 | Venturelli | ............ | G08G 5/0039 |
| 10,522,046 B2* | 12/2019 | Wang | ................... | G01S 5/0027 |
| 10,545,229 B2* | 1/2020 | Rohani | ................ | G01S 13/931 |
| 10,553,122 B1* | 2/2020 | Gilboa-Amir | ..... | G06Q 10/0832 |
| 2011/0221625 A1 | 9/2011 | Cornic et al. | | |
| 2012/0068877 A1* | 3/2012 | Stayton | ................ | G01S 13/933 342/30 |
| 2013/0106645 A1 | 5/2013 | Goodson et al. | | |
| 2015/0339930 A1* | 11/2015 | McCann | ............... | G08G 5/006 701/528 |
| 2016/0069994 A1 | 3/2016 | Allen et al. | | |
| 2016/0196750 A1* | 7/2016 | Collins | ............... | G08G 5/0069 701/14 |
| 2017/0069214 A1* | 3/2017 | Dupray | ................ | G08G 5/0013 |
| 2017/0082745 A1* | 3/2017 | Kronfeld | ................... | G01S 7/22 |
| 2017/0358228 A1* | 12/2017 | Priest | .................... | B64C 39/024 |

OTHER PUBLICATIONS

Communication pursuant to Article 94(3) EPC dated Aug. 13, 2018 in the corresponding EP Application No. EP17382878.1, 8 pages.

"Luxury Automobile Industry Analysis, Trends & Statistics", 2016, http://www.reportlinker.com/ci02180/Luxury-Automobile.html, 2016, printed on Jul. 24, 2020, pp. 1-6.

"Pilotless flying cars versus driverless cars," 2016, http://www.safetyparadigm.com/pilotless-flying-cars-versus-driverless-cars, printed on Jul. 24, 2020, pp. 1-6.

"Autonomous Drone Collision Avoidance based on Aerotenna uSharp radar," 2016, https://www.youtube.com/watch?v=Ca_IPKk38oo, printed on Jul. 23, 2020, pp. 1-3.

"Laser Safety Parameters," Resource Manual, Velodyne, 2007, http://velodynelidar.com/lidar/products/manual/HDLResource%20Manual_lowres.pdf, printed on Jul. 23, 2020 (cover page).

"Worldwide Consumer Camera Drone Sales Numbers for 2015 and 2016," 2015, http://www.droneflyers.com/worldwide-consumer-camera-drone-sales-numbers-for-2015-and-2016, printed on Jul. 23, 2020, pp. 1-8.

"µSharp—360° Sense-and-Avoid Radar," Aerotenna, 2017, http://aerotenna.com/shop/%CE%BCsharp-patch, printed on Jul. 23, 2020, pp. 1-4.

Eddy N., "Google's Larry Page Investing Millions in Flying Cars," 2016, http://www.informationweek.com/it-life/googles-larry-page-investing-millions-in-flying-cars-/d/d-id/1325855, printed on Jul. 23, 2020, pp. 1-7.

Gustafsson et al., "Lidar Measurements Supporting the Ocular Hazard Distance Calculation Using Atmospheric Attenuation," EPJ Wen of Conferences 119, 17008, ILRC 27., 2016, http://www.epj.conferences.org/articles/epjconf/pdf/2016/14/epjconf_ilrc2016_17008.pdf, printed on Jul. 23, 2020, pp. 1-4.

Hassebo Y. et al., "Polarization discrimination technique to maximize LIDAR signal-to-noise ratio for daylight operations," Appl. Opt. vol. 45, No. 22., 2006, http://www.sky.ccny.cuny.edu/wc/Lidar/Refs/Yasser.pdf, printed on Jul. 23, 2020, pp. 1-43.

Kubica V., "Opportunistic radar imaging using a multichannel receiver," Doctor of Philosophy Thesis, Department of Electronic and Electrical Engineering, University College of London, 2016, http://discovery.ucl.ac.uk/1482229/1/ethesis_kubicav_2016.pdf, printed on Jul. 23, 2020, pp. 1-172.

Linn A., "Flying car not as far-fetched a fantasy as you might think," 2004, http://the.honoluluadvertiser.com/article/2004/Aug/29/bz/bz06a.html, printed on Jul. 23, 2020, pp. 1-2.

Meyers R. E. et al., "Space-time Quantum Imaging," Entropy, vol. 17, 2015, pp. 1508-1534.

Radartutorial, "Radar Basics—Absorption," 2017, http://www.radartutorial.eu/07.waves/wa13.en.html, printed on Jul. 23, 2020, one page.

Shi, Lee et al., , "Multichannel Sense-and-Avoid Radar for Small UAVs," 32nd Digital Avionics Systems Conference, Oct. 6-10, 2013, pp. 1-10.

Simonite T., "Self-Driving Cars' Spinning-Laser Problem," MIT Technology Review Mar. 20, 2017, https://www.technologyreview.com/s/603885/autonomous-cars-lidar-sensors/, printed on Jul. 23, 2020, pp. 1-8.

Vadlamani A., et al., "Preliminary design and analysis of a lidar based obstacle detection system," 24th Digital Avionics Systems Conference, Oct. 30, 2005, pp. 1-14.

* cited by examiner

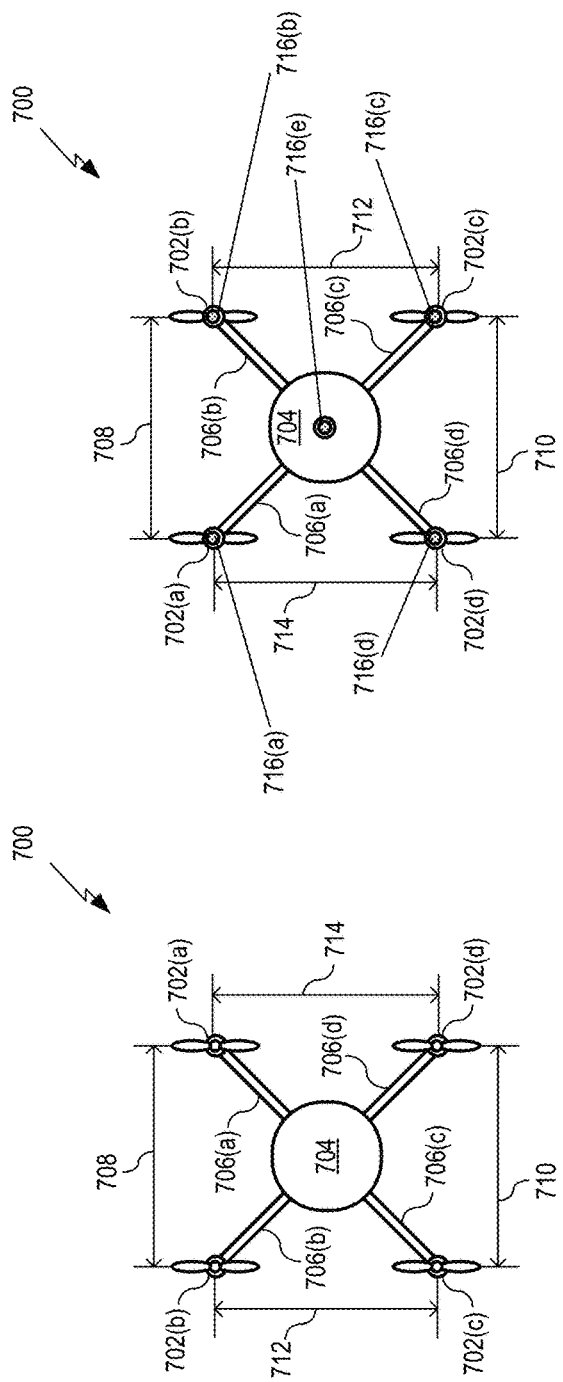
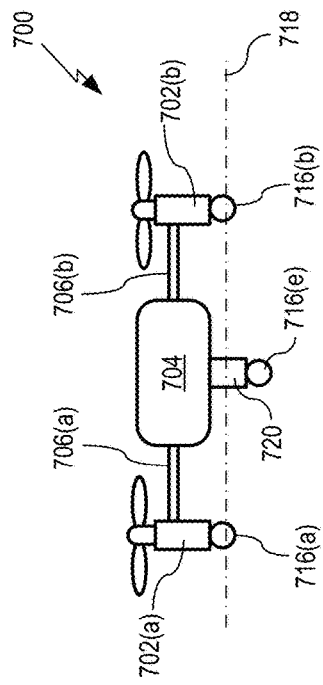
FIG. 7A
FIG. 7B
FIG. 7C

LIGHT-WEIGHT RADAR SYSTEM

BACKGROUND

1. Field

This present invention relates generally to radar systems, and more particularly, to light-weight radar systems for sense and avoid applications in unmanned vehicles ("UVs").

2. Related Art

At present, unmanned vehicles ("UVs") such as, for example, unmanned ground vehicles ("UGVs") and unmanned aerial vehicles ("UAVs") are becoming commonplace. As the number, types, and uses of UVs continues to grow in society, there is also a growing need for obstacle avoidance systems ("OASs") capable of operating on these UVs.

Some of the problems with meeting this need is that many of the modern UVs are subjected to severe payload volume and weight limitations and lack high-power on-board power supplies. At present, most of the known OASs are based on the following technologies: optical cameras; laser LIDAR; radar; and acoustic systems. Unfortunately, each of these technologies has drawbacks that include, for example, very CPU-intensive processing and vulnerability to environmental conditions such as, for example, dust, direct sunlight, fog, or heavy rain for optical cameras. While, LIDAR systems have better performance in the same environmental conditions, LIDAR systems still have CPU-intensive processing, are expensive, and systems with a range of about 1000 meters are bulky and not generally suitable for use in relatively small UVs. Moreover, eye-safety may be a problem for powerful systems with larger ranges.

Radar imaging systems are well known and have been utilized by satellites and governmental (including military) aircraft for decades. However, scaling down a radar-based OAS to the size and weight of small UV (especially a UAV) of, for example, 25 kg or less, is quite challenging and will have performance limitations imposed on the radar-based OAS based on the size, weight, and power generating capability of the small UV. As an example, a V-band (i.e., 40 to 75 GHz) radar-based OAS, while having excellent resolution and acceptable system weight and size for use with a smaller UAV, a V-band radar-based system suffers from high atmosphere attenuation. Moreover, ranges of several miles will require an excessive power supply for a radar-based OAS.

Acoustic systems are also not generally suitable for UVs. In general, designs for acoustic systems do not offer sufficient range because the atmosphere has large acoustic signal attenuation and because sound has a low speed of propagation through the atmosphere. As such, there is a need for a system and method that address these problems.

SUMMARY

A light-weight radar system ("LWRS") for sense and avoid applications in a vehicle is disclosed. The LWRS includes a plurality of receivers, a plurality of transmitters, an obstacle database, and a processing device. The processing device is in signal communication with the plurality of receivers, plurality of transmitters, and the obstacle database. The processing device includes at least one processor and a computer computer-readable medium ("CRM") having encoded thereon computer-executable instructions.

In an example of operation, the computer-executable instructions cause the processor to perform a method that includes transmitting a plurality of transmit radio frequency ("RF") signals from the plurality of transmitters to one or more targets in an environment of operation of the LWRS, receiving a plurality of reflected RF signals at the plurality of receivers from the one or more targets in the environment of operation, performing radar processing on the plurality of reflected RF signals to detect the one or more targets (relevant data from other sources, such as ground-based devices or other elements of UV swarm, may be used, as well), updating the obstacle database with the detected one or more targets, and providing obstacle data to one or more vehicle systems of the vehicle.

Other devices, apparatus, systems, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 7A is a top-view of an example of an implementation of an unmanned aerial vehicle ("UAV") incorporating the LWRS of FIG. 1 is shown in accordance with the present disclosure.

FIG. 7B is a bottom-view of the UAV, shown in FIG. 7A, in accordance with the present disclosure.

FIG. 7C is a side-view of the UAV, is shown in FIGS. 7A and 7B, in accordance with the present disclosure.

DETAILED DESCRIPTION

Disclosed is a light-weight radar system ("LWRS") for sense and avoid applications in a vehicle. The LWRS includes a plurality of receivers, a plurality of transmitters, an obstacle database, and a processing device. The processing device is in signal communication with the plurality of receivers, plurality of transmitters, and the obstacle database. The processing device includes at least one processor and a computer computer-readable medium ("CRM") having encoded thereon computer-executable instructions.

In an example of operation, the computer-executable instructions cause the processor to perform a method that includes transmitting a plurality of transmit radio frequency ("RF") signals from the plurality of transmitters to one or more targets in an environment of operation of the LWRS, receiving a plurality of reflected RF signals at the plurality of receivers from the one or more targets (or relevant data from other sources, such as ground-based devices or other elements of UV swarm, may be used, as well) in the environment of operation, performing radar processing on the plurality of reflected RF signals to detect the one or more targets, updating the obstacle database with the detected one or more targets, and providing obstacle data to one or more vehicle systems of the vehicle.

Figure 1:
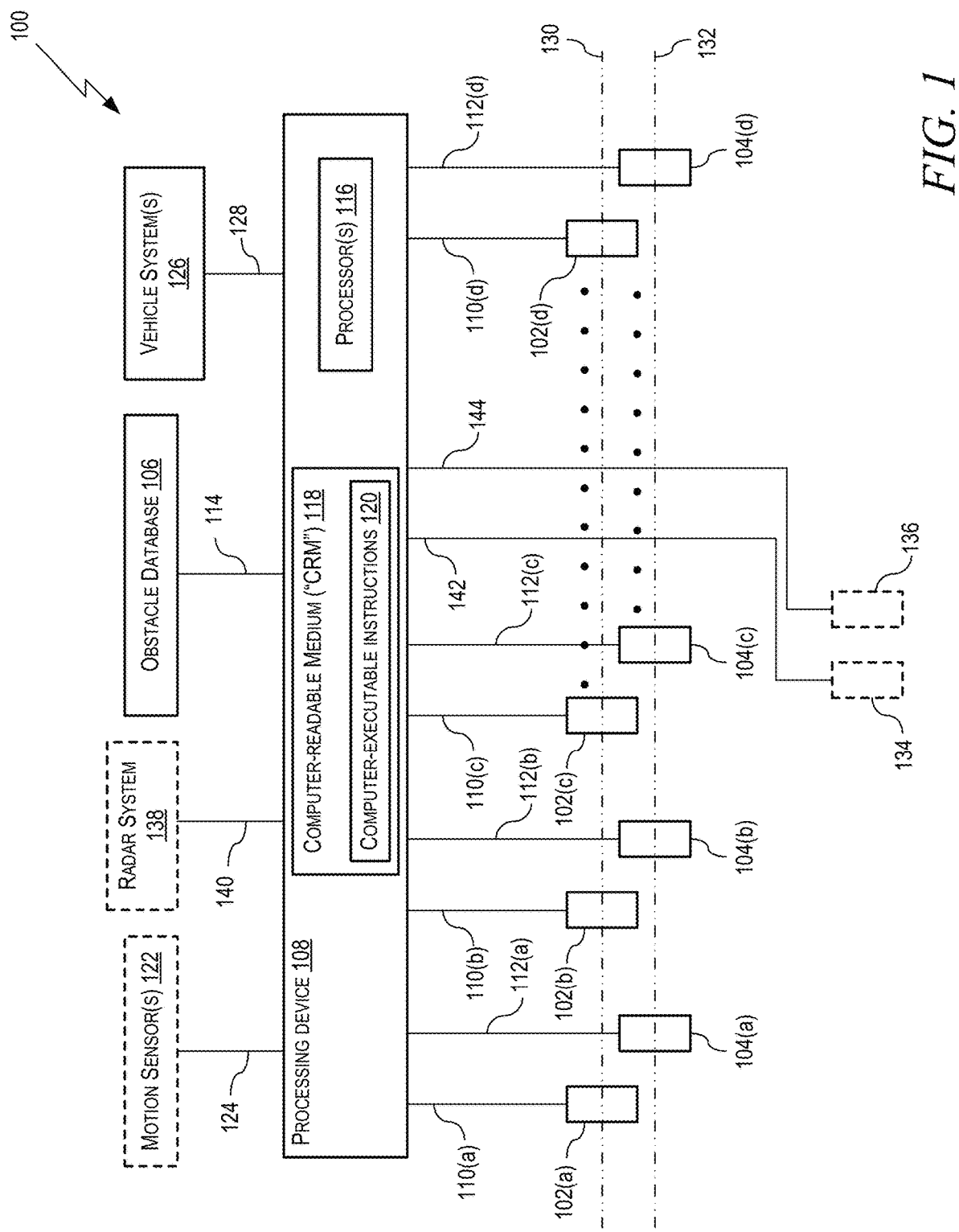
FIG. 1 is a system diagram of an example of an implementation of a light-weight radar system ("LWRS") in accordance with the present disclosure.

As an example, in FIG. 1, a system diagram of an example of an implementation of the LWRS 100 is shown in accordance with the present disclosure. The LWRS 100 includes a plurality of receivers 102(a), 102(b), 102(c), and 102(d), a plurality of transmitters 104(a), 104(b), 104(c), and 104(d), an obstacle database 106, and a processing device 108. The processing device 108 is in signal communication with the plurality of receivers 102(a), 102(b), 102(c), and 102(d), plurality of transmitters 104(a), 104(b), 104(c), and 104(d), and the obstacle database 106 via signal paths 110(a), 110(b), 110(c), 110(d), 112(a), 112(b), 112(c), 112(d), and 114, respectively. The processing device 108 includes at least one processor 116 and the CRM 118 having encoded thereon computer-executable instructions 120. The LWRS 100 may also include an optional one or more motion sensors 122 in signal communication with the processing device 108 via signal path 124 and may be in signal communication with one or more vehicle systems 124 via signal path 128. The LWRS 100 may also include a GPS system (not shown) to provide real-time location information of the LWRS 100. The LWRS 100 may also include one or more radios capable of receiving database update data for the obstacle database 106, traffic control information, location information, and transmitting location information about the LWRS 100. It is appreciated by those of ordinary skill in the art that the plurality of receivers 102(a), 102(b), 102(c), and 102(d), a plurality of transmitters 104(a), 104(b), 104(c), and 104(d) may be combined into a plurality of transceivers.

In this example, the computer-executable instructions 120 cause the processor 116 to transmit a plurality of transmit RF signals from the plurality of transmitters (104(a), 104(b), 104(c), 104(d)) to one or more targets in an environment of operation of the LWRS, receive a plurality of reflected RF signals at the plurality of receivers (102(a), 102(b), 102(c), 102(d)) from the one or more targets in the environment of operation, perform radar processing on the plurality of reflected RF signals to detect the one or more targets, update the obstacle database 106 with the detected one or more targets, and providing obstacle data to one or more vehicle systems 126 of the vehicle. The processing device 108 may perform the radar processing directly or with the assistance of an optional radar system 138 in signal communication with processing device 108 via signal path 140. In this example, the optional radar system 138 may be an on-board mono-static radar system, bi-static radar system, synthetic aperture radar ("SAR") system, or other radar type of system.

Moreover, while only four receivers 102(a), 102(b), 102(c), and 102(d) of the plurality of receivers and only four transmitters 104(a), 104(b), 104(c), 104(d) of the plurality of transmitters are shown in FIG. 1, this is for the purposes of ease of illustration only. It is appreciated by those of ordinary skill in the art that the number of receivers and transmitters may be any plurality that is based on the design of the radar system for use in the LWRS 100.

As a further example, the plurality of receivers 102(a), 102(b), 102(c), and 102(d) may be arranged as a receive planar array antenna located within a first plane 130 and the plurality of transmitters 104(a), 104(b), 104(c), 104(d) may be arranged as a transmit planar array antenna located within a second plane 132. The receive planar array antenna located in the first plane 130 may be coplanar with the transmit planar array antenna located in the second plane 132 or not based on the design of the radar system for use in the LWRS 100.

Moreover, the LWRS 100 may include an optional additional receiver 134 that is optionally located in a position that is not within the first plane 130 and an optional additional transmitter 136 that is optionally located in a position that is not the second plane 132. Alternatively, if the receiver planar array antenna is a circular planar array, the optional additional receiver 134 may be located within the first plane 130 at approximately the center of the receive planar array antenna. Similarly, if the transmit planar array antenna is a circular planar array, the optional additional transmitter 136 may be located within the second plane 132 at approximately the center of the transmit planar array antenna. Again, in this example, the first plane 130 and second plane 132 may be the same resulting in the transmit planar array antenna and receive planar array antenna being coplanar. In these examples, the optional additional receiver 134 and optional additional transmitter 136 are in signal communication with the processing device 108 via signal paths 142 and 144, respectively. Again, in this example, the additional receiver 134 and additional transmitter 136 may be combined into a single transceiver.

It is appreciated by those of ordinary skill in the art that each receiver of the plurality of receivers 102(a), 102(b), 102(c), and 102(d) and each transmitter of the plurality of transmitters 104(a), 104(b), 104(c), 104(d) may be part of the same device. Specifically, the LWRS 100 may utilize a plurality of transmit-receive ("T/R") modules that each include both a transmitter and a receiver within the T/R module. It is appreciated by those of ordinary skill in the art that T/R modules are well known in the art.

Figure 2:
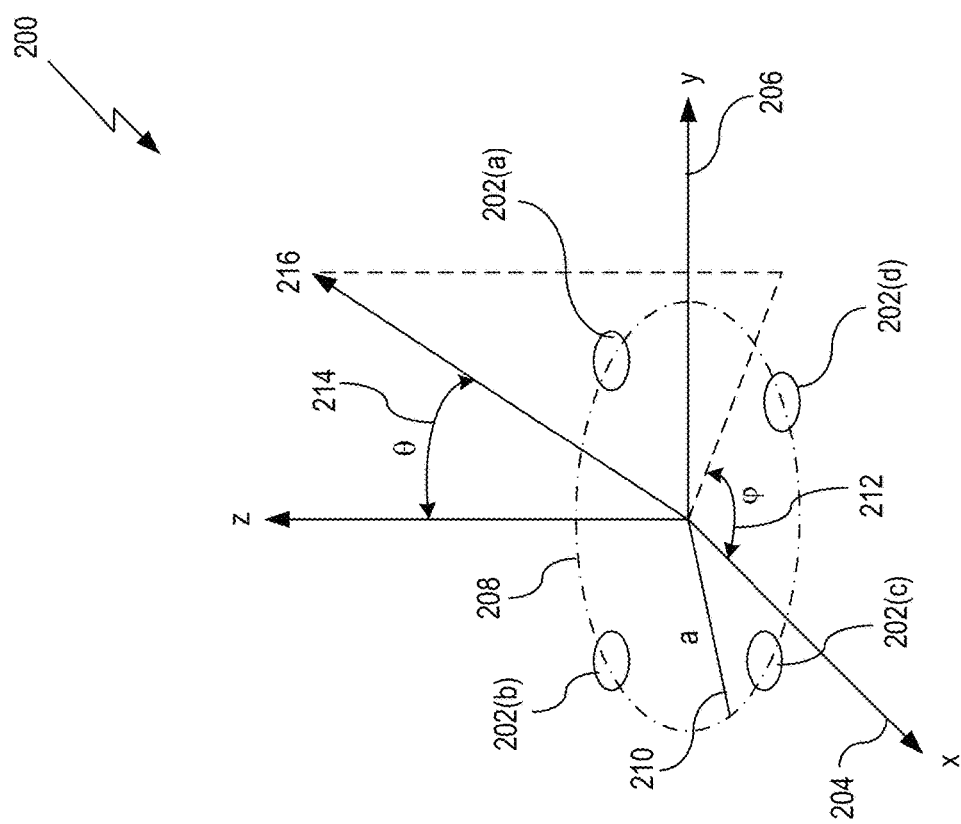
FIG. 2 is a system diagram of an example of an implementation of a known two-dimensional ("2D") antenna array.

Turning to FIG. 2, a system diagram is shown of an example of an implementation of a known two-dimensional ("2D") antenna array 200. In this example, the 2D antenna array 200 (known generally as a uniform circular array) includes a plurality of array elements 202(a), 202(b), 202(c), and 202(d) placed on an x-y plane (formed by an x-axis 204 and a y-axis 206) forming a circle 208 of radius a 210. Moreover, two angles, φ for azimuth 212 and θ for elevation 214, represent the components of the desired direction 216 of a resulting antenna beam formed by the 2D antenna array 200. In this example, each of the array elements 202(a), 202(b), 202(c), and 202(d) is an isotropic antenna element and may correspond to either receiving elements of the four receivers 102(a), 102(b), 102(c), and 102(d) or the radiating elements of the four transmitters 104(a), 104(b), 104(c), and 104(*d*) shown in FIG. 1, where the x-y plane corresponds to either the first plane 130 or second plane 132, respectively.

In general, the array factor (i.e., AF(θ, φ) for the 2D antenna array 200 of N equally spaced elements may be described as follows:

$$AF(\theta, \varphi) = \sum_{n=1}^{N} I_n e^{j[ka\sin\theta\cos(\varphi-\varphi_n)+\alpha_n]},$$

where N is equal to the number of isotropic antenna elements (i.e., N equals 4 in this example), k is equal to $$\frac{2\pi}{\lambda},$$

which is the wave number, a 210 equals the radius of the circle 208, $I_n$ is equal to the amplitude excitation of the $n^{th}$ array element, $\alpha_n$ is equal to the phase excitation of the $n^{th}$ array element, and $\varphi_n$ is equal to $$2\pi\left(\frac{n}{N}\right),$$

which is equal to the angular position of the $n^{th}$ array element.

Figure 3:
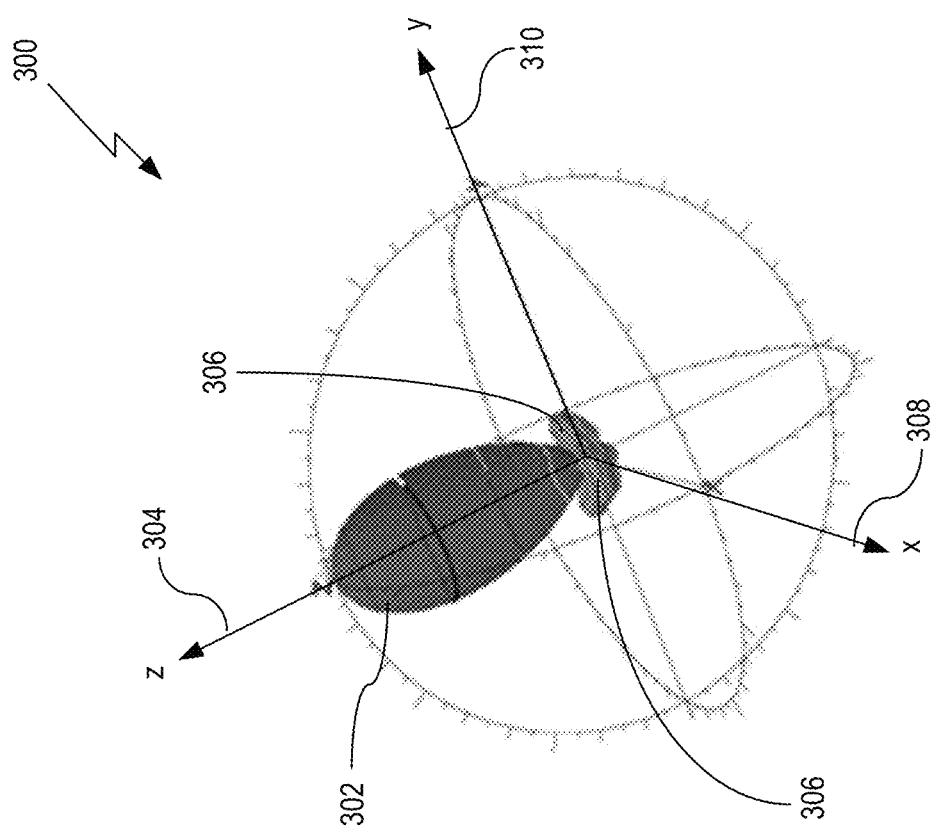
FIG. 3 is a three-dimensional ("3D") plot of an example of an array pattern produced by the 2D antenna array shown in FIG. 2.

In FIG. 3, a three-dimensional ("3D") plot is shown of an example of an array pattern 300 produced by the 2D antenna array 200. The array pattern 300 is shown having a main beam 302 along a z-axis 304 and side-lobes 306 in both the x-axis 308 and y-axis 310.

Figure 4:
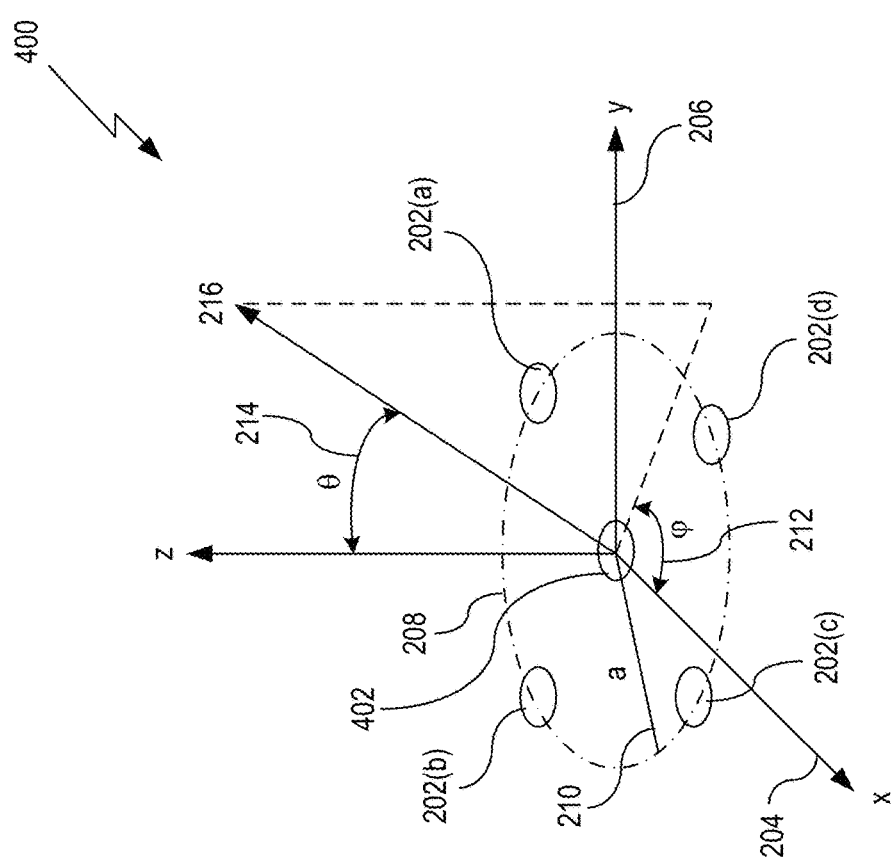
FIG. 4 is a system diagram is shown of an example of an implementation of a modified 2D antenna array having an additional central array element.

In FIG. 4, a system diagram is shown of an example of an implementation of a modified two-dimensional ("2D") antenna array 400 having an additional central array element 402. The central array element 402 is also an isotropic antenna element that may correspond to either the optional additional receiver 134 and optional additional transmitter 136 shown in FIG. 1. The additional central array element 402 may be located in the x-y plane corresponding to either the first plane 130 or second plane 132 or in a position that is not located in either the first plane 130 or second plane 132.

In this example, the additional central array element 402, given the appropriate phase shift, modifies the overall radiation pattern of the modified 2D antenna array 400 in such a way that the directivity is increased while the half-power beamwidth angle is reduced in comparison to the 2D antenna array 200 shown in FIG. 2. The result is a better capability of transmitting or receiving in the desired direction and avoiding unwanted signals. Moreover, the side-lobe levels of the radiation pattern are lower than the ones of the 2D antenna array 200 which also helps to avoid interference.

Figure 5:
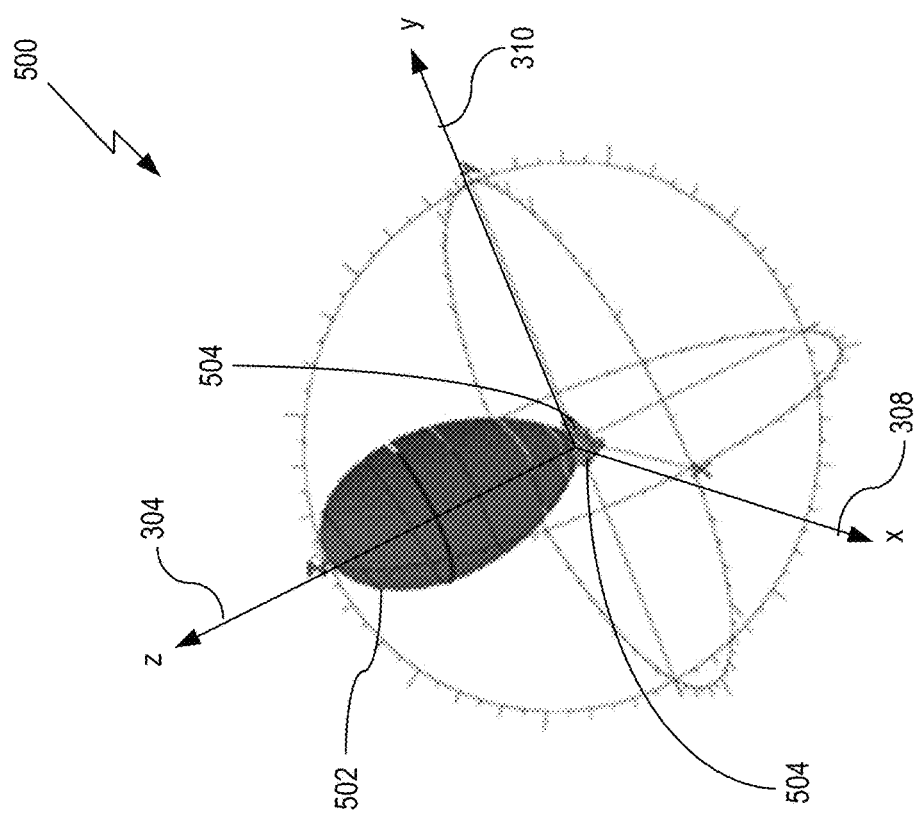
FIG. 5 is a three-dimensional ("3D") plot of an example of another array pattern produced by the modified 2D antenna array.

In FIG. 5, a three-dimensional ("3D") plot is shown of an example of another array pattern 500 produced by the modified 2D antenna array 400. As before, the array pattern 500 is shown having a main beam 502 along a z-axis 304 and side-lobes 504 in both the x-axis 308 and y-axis 310. In this example, the x-axis 308, y-axis 310, and z-axis 304 are the same as shown in FIG. 3. As discussed earlier, in this example, the side-lobe levels of the side-lobes 504 of the radiation patter of the modified 2D antenna array 400 are lower than the side-lobe levels of the side-lobes 306 of the 2D antenna array 200.

It is appreciated by those of ordinary skill in the art that in an example of operation, to steer the main lobe (i.e., the main-beam 302 or 502) in the ($\theta_0$, $\varphi_0$) direction (i.e., along the two angles of φ for azimuth 212 and θ for elevation 214), the phase excitation of the $n^{th}$ element can be chosen to be $$\alpha_n = -ka\sin\theta_0\cos(\varphi_0-\varphi_n).$$

Given that the modified 2D antenna array 400 has one antenna element (i.e., central array element 402) at the center and the radius 210 for this element is equal to 0, the displacement phase factor on the array factor becomes $e^{j\alpha_x}$, where $\alpha_x$ is the phase excitation of the element at the center. The total field (i.e., radiation pattern) of the modified 2D antenna array 400 is determined by the addition of the fields radiated by the individual elements. Thus, the resulting array factor (i.e., AF(θ, φ) for the modified 2D antenna array 400 is the sum of the array factor of the 2D antenna array 200 plus the central array element 402 at the center of the modified 2D antenna array 400 resulting in $$AF(\theta, \varphi) = e^{j\alpha_x} + \sum_{n=1}^{N} I_n e^{j[ka\sin\theta\cos(\varphi-\varphi_n)+\alpha_n]}.$$

Again, in these examples, the plurality of array elements 202(*a*), 202(*b*), 202(*c*), and 202(*d*) may be part of a plurality of T/R modules that includes both a plurality of transmitters and receivers.

In these examples, the type of radar system utilized by the LWRS 100 may be a monostatic radar approach when both the plurality of transmitters 104(*a*), 104(*b*), 104(*c*), and 104(*d*) and the plurality of receivers 102(*a*), 102(*b*), 102(*c*), and 102(*d*) are collocated and the plurality of transmitters 104(*a*), 104(*b*), 104(*c*), and 104(*d*) act as a transmitting antenna array (e.g., 2D antenna array 200 or modified 2D antenna array 400) and the plurality of receivers 102(*a*), 102(*b*), 102(*c*), and 102(*d*) act as a receiving antenna array (e.g., 2D antenna array 200 or modified 2D antenna array 400). It is appreciated by those of ordinary skill in the art that the LWRS 100 may utilize the radar range equation to determine the range of potential targets in the environment of operation of the LWRS 100. An example expression for the radar range equation includes the following relationship for the maximum radar detection range $R_{max}$, $$R_{max} = \sqrt[4]{\frac{P_t G^2 \lambda^2 \sigma}{(4\pi)^3 P_{min}}},$$

where $P_t$ is equal to the transmit power, $P_{min}$ is equal to the minimum detectable signal, λ is equal to the transmit wavelength, σ is equal to the target radar cross section, and G is equal to the antenna gain.

Alternatively, the LWRS 100 may utilize a bistatic radar approach when one or more of the transmitters of the plurality of transmitters transmits 104(*a*), 104(*b*), 104(*c*), 104(*d*) transmits a radar signal and the plurality of receivers 102(*a*), 102(*b*), 102(*c*), and 102(*d*) receive the reflected signals at different locations than the location of the one or more transmitters that transmitted the original radar signal. Moreover, the LWRS 100 may also utilize a multistate radar approach when the LWRS 100 utilizes the plurality of transmitters 104(*a*), 104(*b*), 104(*c*), 104(*d*) and the plurality of receivers 102(*a*), 102(*b*), 102(*c*), and 102(*d*) in a spatially diverse monostatic radar, bistatic radar, or both with a shared area of coverage. It is appreciated that in these examples, the plurality of transmitters may also include the optional additional transmitter 136 and the plurality of receivers may also include the optional additional receiver 134.

Figure 6:
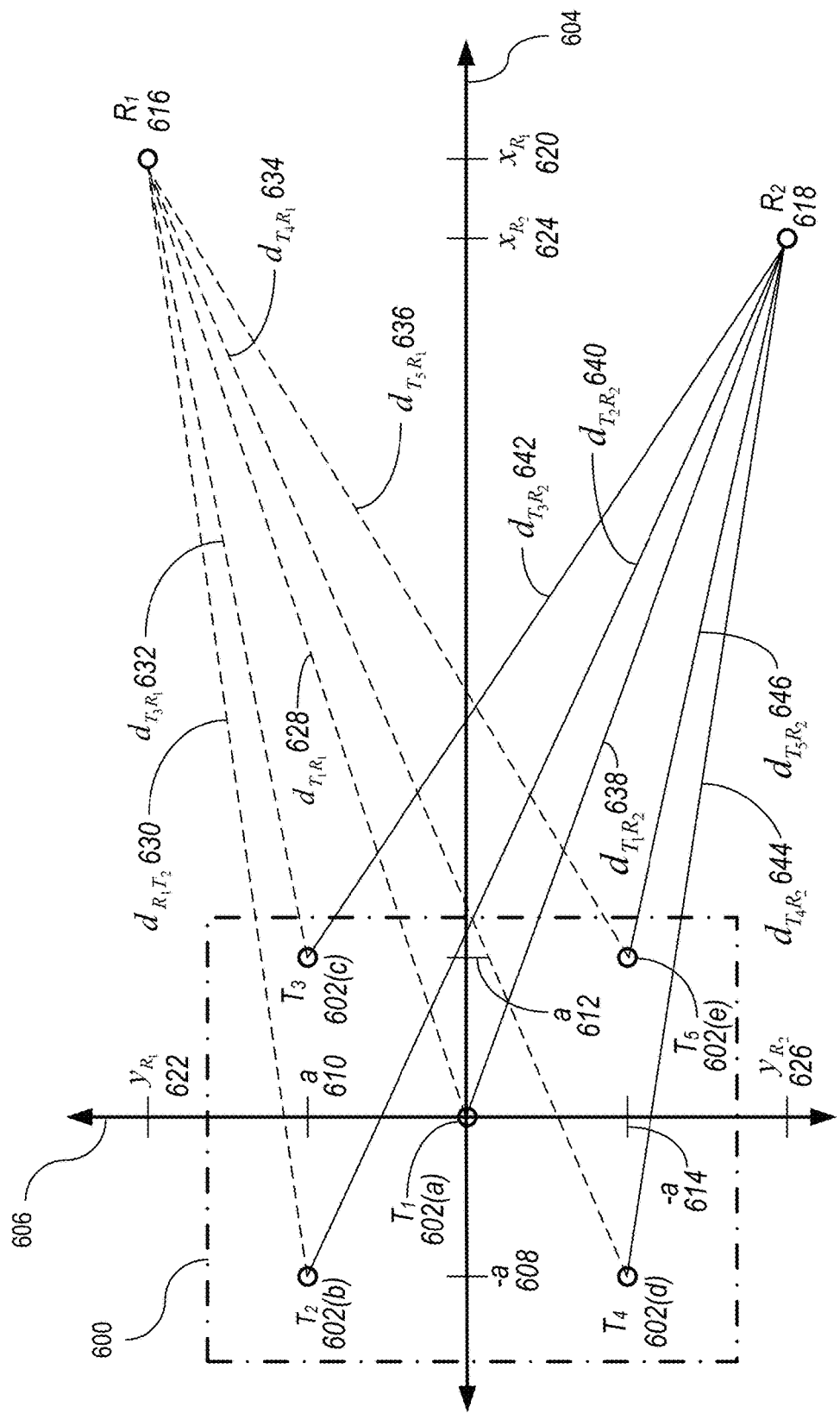
FIG. 6 is a system diagram of an example of an implementation of a bistatic type of radar system in accordance with the present disclosure.

Turning to FIG. 6, a system diagram is shown for an example of an implementation of a bistatic type of radar system 600 in accordance with the present disclosure. The bistatic radar system 600 is part of the LWRS 100. In this example, five antenna array elements $T_1$ 602(*a*), $T_2$ 602(*b*), $T_3$ 602(*c*), $T_4$ 602(*d*), and $T_5$ 602(*e*) are shown in the radar system 600. These antenna array elements $T_1$ 602(*a*), $T_2$ 602(*b*), $T_3$ 602(*c*), $T_4$ 602(*d*), and $T_5$ 602(*e*) correspond to antenna elements of either the receiving elements of the four receivers 102(*a*), 102(*b*), 102(*c*), 102(*d*) and optional additional receiver 134 or the radiating elements of the four transmitters 104(*a*), 104(*b*), 104(*c*), 104(*d*) and optional additional transmitter 136. In this example all five antenna array elements $T_1$ 602(*a*), $T_2$ 602(*b*), $T_3$ 602(*c*), $T_4$ 602(*d*), and $T_5$ 602(*e*) have omnidirectional characteristics where acting as an emitter or a sensor.

In the case of T/R modules, these antenna array elements $T_1$ 602(*a*), $T_2$ 602(*b*), $T_3$ 602(*c*), $T_4$ 602(*d*), and $T_5$ 602(*e*) may correspond to individual common antenna elements of the plurality of T/R modules that incorporate both the receiving elements of the four receivers 102(*a*), 102(*b*), 102(*c*), 102(*d*) and optional additional receiver 134 and the radiating elements of the four transmitters 104(*a*), 104(*b*), 104(*c*), 104(*d*) and optional additional transmitter 136. In this disclosure the radiating elements may also be referred to as emitters and the receivers may also be referred to as sensors. For purposes of illustration each of the five antenna array elements $T_1$ 602(*a*), $T_2$ 602(*b*), $T_3$ 602(*c*), $T_4$ 602(*d*), and $T_5$ 602(*e*) will be assumed to be an emitter/sensor pair that is capable of both transmitting (i.e., emitting) signals to potential targets (e.g., a first target $R_1$ 616 and second target $R_2$ 618) in the environment of operation of the LWRS 100 and receiving (i.e., sensing) reflected signals from the potential targets (i.e., first target $R_1$ 616 and second target $R_2$ 618).

In this example, the $T_1$ 602(*a*) antenna array element is located at the center of the intersection of an x-axis 604 and y-axis 606. The $T_2$ 602(*b*) antenna array element is at a position located at a negative *a* 608 distance along the x-axis 604 and a positive *a* 610 distance along the y-axis 606. The $T_3$ 602(*c*) antenna array element is at a position located at a positive *a* 612 distance along the x-axis 604 and the positive *a* 610 distance along the y-axis 606. The $T_4$ 602(*d*) antenna array element is at a position located at the negative *a* 608 distance along the x-axis 604 and a negative *a* 614 distance along the y-axis 606. The $T_5$ 602(*e*) antenna array element is at a position located at the positive *a* 612 distance along the x-axis 604 and the negative *a* 614 distance along the y-axis 606.

Moreover, in this example, the first target $R_1$ 616 is at a position located at a positive $x_{R_1}$ 620 distance along the x-axis 604 and a positive $y_{R_1}$ 622 distance along the y-axis 606. The second target $R_2$ 618 is at a position located at a positive $x_{R_2}$ 624 distance along the x-axis 604 and a negative $y_{R_2}$ 626 distance along the y-axis 606.

In the bistatic type of radar system 600, the range to the first target $R_1$ 616 and the second target $R_2$ 618 is determined by transmitting one or more signals at the first target $R_1$ 616 and the second target $R_2$ 618 from a single transmitter (i.e., a single antenna array element of the plurality of antenna array elements $T_1$ 602(*a*), $T_2$ 602(*b*), $T_3$ 602(*c*), $T_4$ 602(*d*), and $T_5$ 602(*e*)) and receiving the direct transmitted signal and reflected signals from the first target $R_1$ 616 and the second target $R_2$ 618 at the individual antenna array elements of the $T_1$ 602(*a*), $T_2$ 602(*b*), $T_3$ 602(*c*), $T_4$ 602(*d*), and $T_5$ 602(*e*) and determining time differences of arrival of the reflected signals and direct signal. This information may also be determined by the "time of flight" between the signals.

As an example, in order to calculate the theoretical time of flight of the signals shown in FIG. 6, the distances from the individual transmitters of the antenna array elements $T_1$ 602(*a*), $T_2$ 602(*b*), $T_3$ 602(*c*), $T_4$ 602(*d*), and $T_5$ 602(*e*) to the two objects (i.e., first target $R_1$ 616 and the second target $R_2$ 618) are first defined. Note that, in this example, target coordinates ($x_{R_1}$, $y_{R_1}$) and ($x_{R_2}$, $y_{R_2}$) are assumed to make possible the computation of time of flight. In the real case, target coordinates will be unknown, and the respective times of flight will be measured, i.e., known. As such, the $d_{T_1 R_1}$ 628 distance from the first antenna array element $T_1$ 602(*a*) to the first target $R_1$ 616 is $$d_{T_1 R_1} = \sqrt{(x_{R_1} - x_{T_1})^2 + (y_{R_1} - y_{T_1})^2},$$

where in this example $x_{T_1}$ and $y_{T_1}$ are equal to 0 since they are at the origin of the x-axis 604 and y-axis 606. The $d_{T_2 R_1}$ 630 distance from the first antenna array element $T_2$ 602(*b*) to the first target $R_1$ 616 is $$d_{T_2 R_1} = \sqrt{(x_{R_1} - x_{T_2})^2 + (y_{R_1} - y_{T_2})^2},$$

where in this example $x_{T_2}$ is equal to the negative *a* 608 distance and $y_{T_2}$ is equal to the positive *a* 610 distance. The $d_{T_3 R_1}$ 632 distance from the first antenna array element $T_3$ 602(*c*) to the first target $R_1$ 616 is $$d_{T_3 R_1} = \sqrt{(x_{R_1} - x_{T_3})^2 + (y_{R_1} - y_{T_3})^2},$$

where in this example $x_{T_3}$ is equal to the positive *a* 612 distance and $y_{T_3}$ is equal to the positive *a* 610 distance. The $d_{T_4 R_1}$ 634 distance from the first antenna array element $T_4$ 602(*d*) to the first target $R_1$ 616 is $$d_{T_4 R_1} = \sqrt{(x_{R_1} - x_{T_4})^2 + (y_{R_1} - y_{T_4})^2},$$

where in this example $x_{T_4}$ is equal to the negative *a* 608 distance and $y_{T_4}$ is equal to the negative *a* 614 distance. The $d_{T_5 R_1}$ 636 distance from the first antenna array element $T_5$ 602(*e*) to the first target $R_1$ 616 is $$d_{T_5 R_1} = \sqrt{(x_{R_1} - x_{T_5})^2 + (y_{R_1} - y_{T_5})^2},$$

where in this example $x_{T_5}$ is equal to the positive *a* 612 distance and $y_{T_5}$ is equal to the negative *a* 614 distance.

With regards to the second target $R_2$ 618, the $d_{T_1 R_2}$ 638 distance from the first antenna array element $T_1$ 602(*a*) to the second target $R_2$ 618 is $$d_{T_1 R_2} = \sqrt{(x_{R_2} - x_{T_1})^2 + (y_{R_2} - y_{T_1})^2},$$

where in this example $x_{T_1}$ and $y_{T_1}$ are equal to 0 since they are at the origin of the x-axis 604 and y-axis 606. The $d_{T_2 R_2}$ 640 distance from the first antenna array element $T_2$ 602(*b*) to the second target $R_2$ 618 is $$d_{T_2 R_2} = \sqrt{(x_{R_2} - x_{T_2})^2 + (y_{R_2} - y_{T_2})^2},$$

where in this example $x_{T_2}$ is equal to the negative *a* 608 distance and $y_{T_2}$ is equal to the positive *a* 610 distance.

The $d_{T_3 R_2}$ 642 distance from the first antenna array element $T_3$ 602(*c*) to the second target $R_2$ 618 is $$d_{T_3 R_2} = \sqrt{(x_{R_2} - x_{T_3})^2 + (y_{R_2} - y_{T_3})^2},$$

where in this example $x_{T_3}$ is equal to the positive *a* 612 distance and $y_{T_3}$ is equal to the positive *a* 610 distance. The $d_{T_4 R_2}$ 644 distance from the first antenna array element $T_4$ 602(*d*) to the second target $R_2$ 618 is $$d_{T_4R_2} = \sqrt{(x_{R_2}-x_{T_4})^2 + (y_{R_2}-y_{T_4})^2},$$

where in this example $x_{T_4}$ is equal to the negative a 608 distance and $y_{T_4}$ is equal to the negative a 614 distance. The $d_{T_5R_2}$ 646 distance from the first antenna array element $T_5$ 602(*e*) to the second target $R_2$ 618 is $$d_{T_5R_2} = \sqrt{(x_{R_2}-x_{T_5})^2 + (y_{R_2}-y_{T_5})^2},$$

where in this example $x_{T_5}$ is equal to the positive a 612 distance and $y_{T_5}$ is equal to the negative a 614 distance. In this example, $$x_{T_2} = x_{T_4} = y_{T_4} = y_{T_5} = -a \text{ and } x_{T_3} = x_{T_5} = y_{T_2} = y_{T_3} = a,$$

where a is half the distance between the x-axis spacing of $T_2$ 602(*b*) and $T_4$ 602(*d*) and $T_3$ 602(*c*), respectively, and $T_5$ 602(*e*) and also half the distance between the y-axis spacing of $T_2$ 602(*b*) and $T_3$ 602(*c*) and $T_4$ 602(*d*) and $T_5$ 602(*e*), respectively.

Target location may be also defined in terms of $d_1$ and $d_2$ distances to and x-axis coordinates $x_{R_1}$ 620 and $x_{R_2}$ 624 for the first target $R_1$ 616 and the second target $R_2$ 618. Then, the y-axis coordinates for the first target $R_1$ 616 and the second target $R_2$ 618 may be determined with the following relationships $$y_{R_1} = \sqrt{d_1^2 - x_{R_1}^2} \text{ and } y_{R_2} = \sqrt{d_2^2 - x_{R_2}^2}.$$

The respective time of flight times are then as follows:

$$t_{T_1R_1} = \frac{2d_{T_1R_1}}{c}; \quad t_{T_2R_1} = \frac{d_{T_1R_1} + d_{T_2R_1}}{c}; \quad t_{T_3R_1} = \frac{d_{T_1R_1} + d_{T_3R_1}}{c};$$

$$t_{T_4R_1} = \frac{d_{T_1R_1} + d_{T_4R_1}}{c}; \quad t_{T_5R_1} = \frac{d_{T_1R_1} + d_{T_5R_1}}{c}; \quad t_{T_1R_2} = \frac{2d_{T_1R_2}}{c};$$

$$t_{T_2R_2} = \frac{d_{T_1R_2} + d_{T_2R_2}}{c}; \quad t_{T_3R_2} = \frac{d_{T_1R_2} + d_{T_3R_2}}{c};$$

$$t_{T_4R_2} = \frac{d_{T_1R_2} + d_{T_4R_2}}{c}; \text{ and } t_{T_5R_2} = \frac{d_{T_1R_1} + d_{T_5R_2}}{c},$$

where c is the speed of light. In this example, the a priori assumed $d_1$ and $d_2$ estimate for the distances to and x-axis coordinates $x_{R_1}$ 620 and $x_{R_2}$ 624 for the first target $R_1$ 616 and the second target $R_2$ 618 may be retrieved values from the obstacle database 106 of FIG. 1. Alternatively, these values may be computed using the known coordinates of on-board transmitters and the measured time of flight as described earlier. Data from the obstacle database 106 may be retrieved to check whether it matches some portion of the data obtained by the on-board sensors. It if does, the sensor data matching data retrieved from the obstacle database 106 are removed from further processing.

In order to properly identify the signals transmitted and received from the radar system 600, the radar system 600 may operate with operational bandwidth having a center frequency of operation that is predetermined by design (e.g., a bandwidth within the C, $K_a$ or $K_u$ band). Then within this operational bandwidth, each transmitter of the plurality of transmitters 104(*a*), 104(*b*), 104(*c*), 104(*d*) and optional additional transmitter 136 may transmit a signal that has a different frequency within the operational bandwidth. These different frequencies could be individually assigned to specific transmitters within the plurality of transmitters 104(*a*), 104(*b*), 104(*c*), 104(*d*) and optional additional transmitter 136 so as to identify which transmitter emitted a given signal.

Utilizing this approach, each receiver in the plurality of receivers 102(*a*), 102(*b*), 102(*c*), 102(*d*) and optional additional receiver 134 is able to identify the specific transmitter origin of any received signal whether directly received from a specific transmitter or whether reflected by an object (e.g., the first target $R_1$ 616 and the second target $R_2$ 618). Is this example, the different frequencies should be spaced apart (i.e., shifted in frequency) sufficiently to allow for clear identification with Doppler-shifts of the signals caused by moving objects/targets. Moreover, if center transmitter and receiver pair located at $T_1$ 602(*a*) is placed in a plane that is outside of the same plane as the other antenna array elements $T_2$ 602(*b*), $T_3$ 602(*c*), $T_4$ 602(*d*), and $T_5$ 602(*e*) (i.e., vertically spaced apart from), this adds to spatial diversity that may assist in better estimating the positions of the first target $R_1$ 616 and the second target $R_2$ 618.

Utilizing these relationships in combination with the time of flight of signals sent from any of the transmitters, bounced from an obstacle and received by any two of the sensors allows the estimate of the coordinates of the obstacle (i.e., either the first target $R_1$ 616 and the second target $R_2$ 618). This estimate is further improved is information from more than two sensors is utilized. Note, that all of the transmitters and receivers need to belong to the same LWRS. Therefore, this method may be used, e.g., by swarms of platforms.

Stated another way, when one of the transmitters of the LWRS 100 emits a signal pulse towards a target and hits the target, part of the emitted signal pulse is reflected back towards the LWRS 100, which is detected by a plurality of receivers at the LWRS 100 (including possibly a receiver located in the same position as the transmitter that emitted the signal pulse). If the transmitter that emitted the signal pulse is operating at a specific frequency that identifies that transmitter, each receiver that receives the reflected signal pulse knows that that reflected signal pulse was originally produced that given transmitter because of the frequency of the reflected signal pulse. In this example, each of the receivers would have an operating bandwidth that allows the receiver to receive signals at all the frequencies assigned to the different transmitters.

As such, one received by one or more receivers, the reflected signal pulses are utilized to generate the time of flight from the originating transmitter to the target and then to a specific receiver. This is repeated for all of the receivers that receive the reflected signal pulse. The resulting different values of the time of flight for each individual receiver represents the time shift of the received reflection (i.e., the reflected signal pulse) as a function of distance traveled by the signal from the originating transmitter to the target and then to the given receiver. This process may be expanded by having all of the transmitters simultaneously emit individual signal pulses at different frequencies that are each received by the individual receivers.

In general, since each transmitter and receiver (i.e., emitter/sensor) has a slightly different position relative to the target, the individual "footprint" of the returned signal pulse is indicative of the position of the target relative to the LWRS 100. In this example, the relative azimuth and elevation of the target is coded in the shape of the return front across various sensors and the distance to the target is contained in the time delay of the returns of the emitted signal pulse.

In FIG. 7A, a top-view of an example of an implementation of an unmanned aerial vehicle ("UAV") 700 is shown incorporating the LWRS 100 in accordance with the present disclosure. For illustration purposes, the UAV 700 is shown having four rotors 702(*a*), 702(*b*), 702(*c*), and 702(*d*) for flight propulsion. It is appreciated by those of ordinary skill in the art that other numbers of rotors and other rotor arrangements may also be utilized. The four rotors 702(a), 702(b), 702(c), and 702(d) extend out from a body 704 of the UVA 700 via four extension members 706(a), 706(b), 706(c), and 706(d). In this first distance 708 between the first rotor 702(a) and second rotor 702(b) is equal to the second distance 710 between the third rotor 702(c) and the four rotor 702(d). The third distance 712 between the second rotor 702(b) and the third rotor 702(c) is equal to the fourth distance 714 between the first rotor 702(a) and the fourth rotor 702(d). Moreover, in this example, all four distances 708, 710, 712, and 714 are assumed to be equal. In this example, the four distances are the distance a described in FIG. 6 as positive distances a 610 and 612 and negative distances a 608 and 614.

In FIG. 7B, a bottom-view of the UAV 700 is shown in accordance with the present disclosure. In this example, the UAV 700 is shown to include five emitter/sensor pairs 716(a), 716(b), 716(c), 716(d), and 716(e) that correspond to the five antenna array elements $T_1$ 602(a), $T_2$ 602(b), $T_3$ 602(c), $T_4$ 602(d), and $T_5$ 602(e) shown in FIG. 6 and the plurality of transmitters 104(a), 104(b), 104(c), 104(d) and optional additional transmitter 136 and the plurality of receivers 102(a), 102(b), 102(c), 102(d) and optional additional receiver 134 shown in FIG. 1.

In FIG. 7C, a side-view of the UAV 700 is shown in accordance with the present disclosure. In this view, the fifth emitter/sensor pair 716(e) is shown extending vertically beyond a first plane 718 that is coplanar with the four other emitter/sensor pairs 716(a), 716(b), 716(c), and 716(d). In this example, the fifth emitter/sensor pair 716(e) may be extended outward from the body 704 of the UAV in the vertical direction by a vertical member 720.

Figure 8:
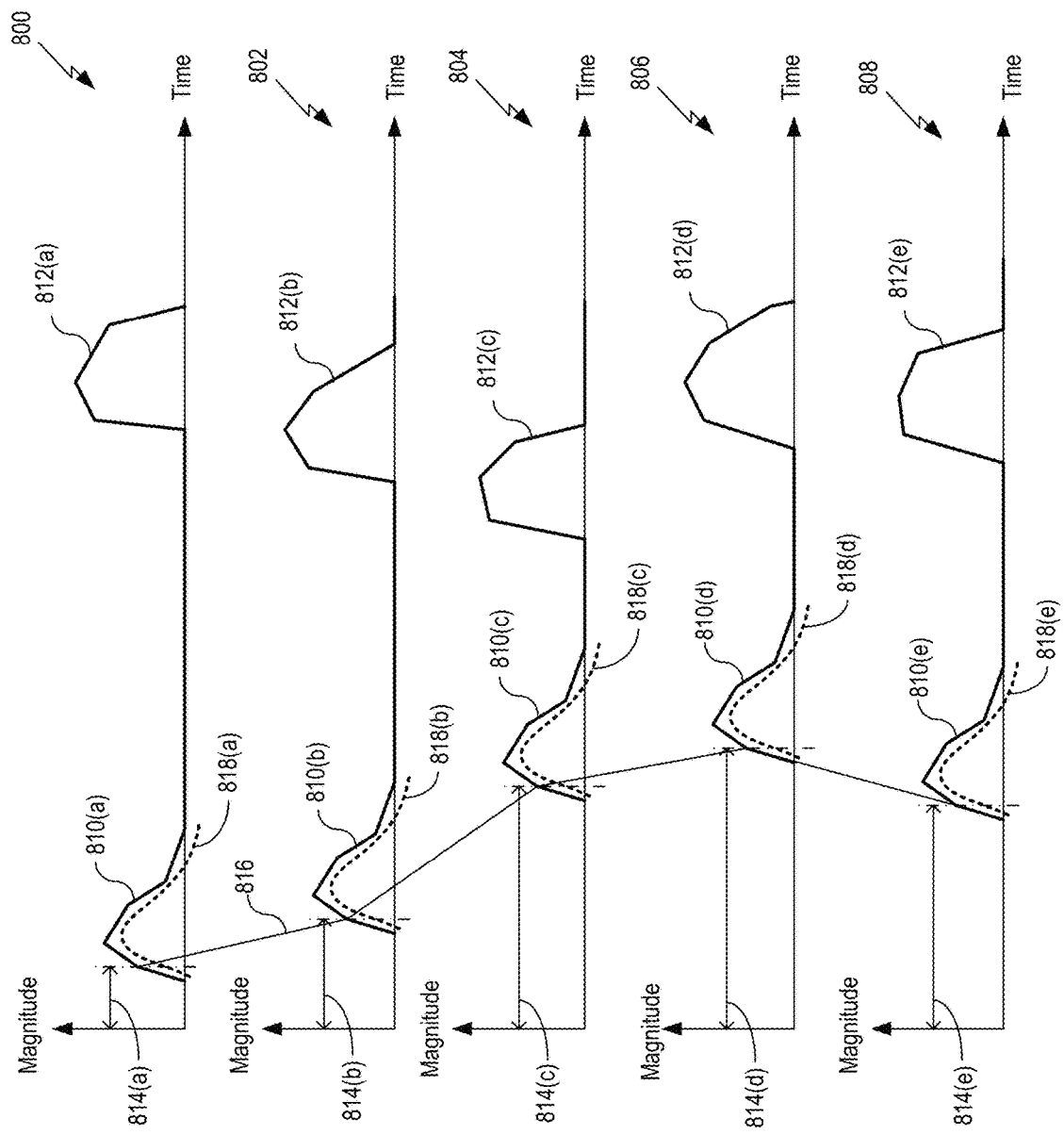
FIG. 8 shows five plots of examples of the target returns from a pair of targets in accordance with the present disclosure.

Turning to FIG. 8, five plots 800, 802, 804, 806, and 808 of examples of the target return from a pair of targets are shown in accordance with the present disclosure. Selected target return characteristics can be used to obtain additional target identification cues, through matching with database information. In this example, the five antenna array elements $T_1$ 602(a), $T_2$ 602(b), $T_3$ 602(c), $T_4$ 602(d), and $T_5$ 602(e) shown in FIG. 6 are utilized to generate the five plots 800, 802, 804, 806, and 808 and the targets are assumed to be the first target $R_1$ 616 and the second target $R_2$ 618. All of the plots show return amplitudes versus time and the reflected signal pulses that generate the returns are assumed to be originally generated by an emitted signal pulse from a transmitter located at antenna array element $T_1$ 602(a) (e.g., optional transmitter 136).

In this example, the return for the reflected signal pulse received at antenna array element $T_3$ 602(c) is shown in the first plot 800. The return for the received reflected signal pulse at antenna array element $T_5$ 602(e) is the second plot 802 and the return for the received reflected signal pulse at antenna array element $T_2$ 602(b) is the third plot 804. Moreover, the return for the received reflected signal pulse at antenna array element $T_4$ 602(d) is the fourth plot 806 and the return for the received reflected signal pulse at antenna array element $T_1$ 602(a) is the fifth plot 808. In this example, the first plot 800 includes a return signature 810(a) for the first target $R_1$ 616 and another return signature 812(a) for the second target $R_2$ 618.

In this example, the second plot 802 includes a return signature 810(b) for the first target $R_1$ 616 and another return signature 812(b) for the second target $R_2$ 618 and the third plot 804 includes a return signature 810(c) for the first target $R_1$ 616 and another return signature 812(c) for the second target $R_2$ 618. Moreover, the fourth plot 806 includes a return signature 810(d) for the first target $R_1$ 616 and another return signature 812(d) for the second target $R_2$ 618 and the fifth plot 808 includes a return signature 810(e) for the first target $R_1$ 616 and another return signature 812(e) for the second target $R_2$ 618.

From these plots 800, 802, 804, 806, and 808, it is possible to determine the distance to the target of interest. For example, the distance from the first target $R_1$ 616 to the antenna array element $T_3$ 602(c) is related to the first time 814(a) to the return signature 810(a), the distance from the first target $R_1$ 616 to the antenna array element $T_5$ 602(e) is related to the second time 814(b) to the return signature 810(b), and the distance from the first target $R_1$ 616 to the antenna array element $T_2$ 602(b) is related to the third time 814(c) to the return signature 810(c). Moreover, the distance from the first target $R_1$ 616 to the antenna array element $T_4$ 602(d) is related to the fourth time 814(d) to the return signature 810(d) and the distance from the first target $R_1$ 616 to the antenna array element $T_1$ 602(a) is related to the fifth time 814(e) to the return signature 810(e).

Moreover, a target position trace 816 of the first target $R_1$ 616 may be generated from the return signatures 810(a), 810(b), 810(c), 810(d), and 810(e) and the first target $R_1$ 616 may be compared to the stored obstacles in the obstacle database 106 (shown in FIG. 1) by correlating the return signatures 810(a), 810(b), 810(c), 810(d), and 810(e) against the stored obstacles in the obstacle database 106. If there is a match with a known obstacle in the obstacle database 106, the processing device 108 produces the resulting correlation signals 818(a), 818(b), 818(c), 818(d), and 818(e).

Figure 9:
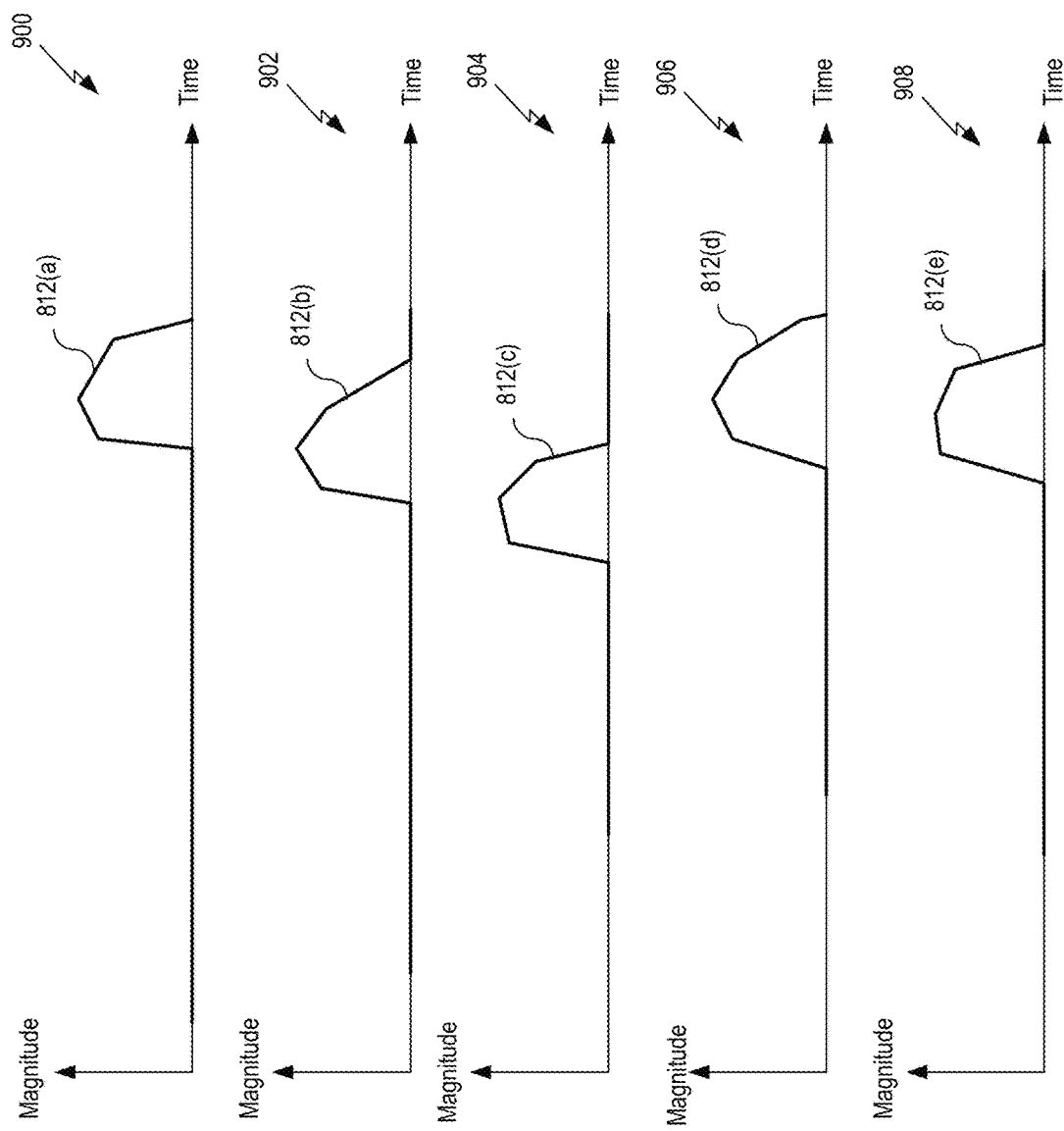
FIG. 9 shows five plots of examples of the time of flight returns from the second target shown in FIG. 8 in accordance with the present disclosure.

Based on these returns and utilizing the obstacle database 106 for matching the return characteristics, such as envelope shape or frequency spectrum of the returns, against stored returns of known obstacles in the obstacle database 106, certain characteristics of the first target $R_1$ 616 and second target $R_2$ 618 such as the size, shape, surface, and material may be identified. Since in this example, many of the return signals will overlap, the process of identifying the targets may utilize a three-dimensional model of surrounding obstacles stored in the obstacle database 106 and a correlation process for precise location of the known obstacles which may subsequently be removed from the returns shown in the plurality of plots 800, 802, 804, 806, and 808. Specifically, in FIG. 9, the five plots 900, 902, 904, 906, and 908 are shown of examples of the time of flight returns 812(a), 812(b), 812(c), 812(d), and 812(d) from the second target $R_2$ 618 in accordance with the present disclosure. In this example, since the return signatures 810(a), 810(b), 810(c), 810(d), and 810(e) of the first target $R_1$ 616 are of a located and identified known obstacle in the obstacle database 106, they have been removed from the processed information to produce the new plots 900, 902, 904, 906, and 908 of the processed signals that only include the return signatures 812(a), 812(b), 812(c), 812(d), and 812(e) of the second target $R_2$ 618.

This process is repeated until all the targets/obstacles have been located and identified and all of the corresponding return signatures have been assigned to objects/targets/obstacles in the model of the operational environment in the obstacle database 106. In general, by removing the return signatures of known obstacles, which can be cooperative (i.e., they communicate their position to the LWRS 100) or otherwise known targets (e.g., walls, terrain, water, etc.), the process allows the use of a "clean" signal for precise location of unknown/new targets/objects.

Utilizing this process, the LWRS 100 is capable of high precision as well as reliable detection of targets/objects in the operational environment. Additionally, if a complete picture of all the obstacles in the surrounding operational environment is not needed, the signal processing may be limited to just the first returns. Moreover, in this process the time information may be frequency modulated into radar carrier frequencies, where frequency sweeps would be emitted repeatedly instead of emitting signal pulses. Furthermore, the repeated execution of this process (which may be several times per second) allows for the determination of target velocities. Alternatively, the Doppler shift of the return signatures may be evaluated to determine the relative velocities of the targets.

Based on the previous discussions, the type of radar system utilized by the LWRS 100 may also be a SAR system, where as the LWRS 100 moves, the LWRS 100 utilizes a side-looking radar scanning the surrounding operational environment that is perpendicular the direction of travel of the LWRS 100. SAR principals are well known to those of ordinary skill in the art. In this example, example relationships for azimuth and range resolutions are $$\Delta_{Azimuth} = \sqrt{\frac{\lambda \cdot R}{2}} \text{ and } \Delta_{Range} = \frac{c}{2 \cdot B},$$

where $\lambda$ is the wavelength, R is to the range, c is the velocity of light, and B is the bandwidth.

As an example, the approximate frequency of a radar to support a 5 cm spatial resolution may be determined as follows. The signal travel time to 3 miles and back is equal to $$\text{time} = \frac{\text{distance}}{c} = \frac{2 \cdot 4{,}857 \text{ m}}{299{,}792{,}458 \text{ m/s}} = 3.24 \times 10^{-5} \text{ seconds},$$

where c is the speed of light. This allows for a relatively high scan rate in the kilohertz range.

Figure 10:
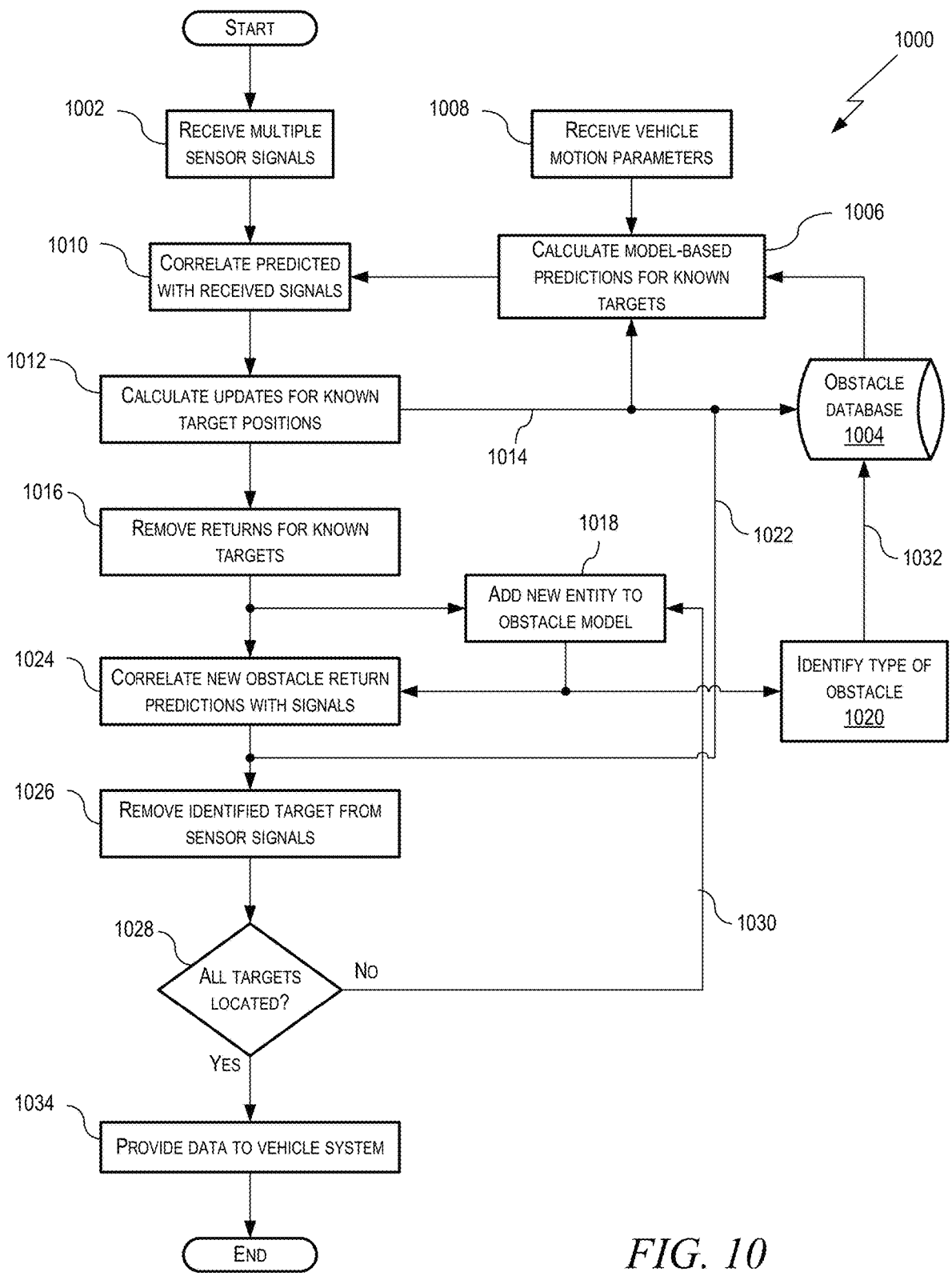
FIG. 10 is a flowchart of an example of an implementation of a method performed by the LWRS in accordance with the present disclosure.

Turning to FIG. 10, a flowchart of an example of an implementation of a method 1000 performed by the LWRS 100 is shown in accordance with the present disclosure. In this example, the computer-executable instructions 120 cause the processor 116 to perform the method that includes transmitting a plurality of transmit radio frequency ("RF") signals from the plurality of transmitters to one or more targets in an environment of operation of the LWRS 100, receiving a plurality of reflected RF signals at the plurality of receivers from the one or more targets in the environment of operation, performing radar processing on the plurality of reflected RF signals to detect the one or more targets, updating the obstacle database 106 with the detected one or more targets, and providing obstacle data to one or more vehicle systems 126 of the vehicle (e.g., UAV 700).

Specifically, the method 1000 starts by transmitting a plurality of transmit RF signals from the plurality of transmitters (104(*a*), 104(*b*), 104(*c*), 104(*d*)) to one or more targets (e.g., first target R$_1$ 616 and the second target R$_2$ 618) in an environment of operation. The method 1000 then receives 1002 multiple sensor signals—i.e., receives a plurality of reflected RF signals at the plurality of receivers (102(*a*), 102(*b*), 102(*c*), 102(*d*)) from the one or more targets in the environment of operation. The method 1000 then performs radar processing on the plurality of reflected RF signals to detect the one or more targets. The performing radar processing includes receiving 1004 retrieved obstacle data from the obstacle database and calculating 1006 a model of predicted known targets, where the model of predicted known targets includes predicted known target data corresponding to known targets within the environment of operation. If the one or more motion sensors 122 are present, the method 1000 may also include receiving vehicle motion parameters (i.e., motion data of the vehicle) with the one or more motion sensors 122 that is passed to the processing device 108 to calculate 1006 the model of predicted known targets utilizing the motion data. The method 1000 then correlates 1010 the predicted signals with the received signals—i.e., the plurality of reflected RF signals against the model of predicted known targets to produce a first correlated target data, where the first correlated target data includes known target data and new target data and where the known target data corresponds to the predicted known target data. The method 1000 then calculates 1012 updates known target positions—i.e., for the model of predicted known targets from the first correlated target data to produce updated known obstacle position data having updated known target data. The method 1000 then updates 1014 the obstacle database 106 with the known obstacle position data and the model of predicted known targets with the known obstacle position data. The method 1000 then removes 1016 the known target data from the first correlated target data to produce a modified first correlated target data that includes the new target data without the known target data. The method 1000 then adds 1018 the new target data to an obstacle model, wherein the obstacle model includes the new target data that corresponds the one or more targets detected from the reflected RF signals, identifies 1020 a type of obstacle from the new target data, and updates 1022 the obstacle database with the detected one or more targets that includes the new target data and type of obstacle for the one or more targets. The method 100 then correlates 1024 the modified first correlated target data against the updated known obstacle position data to produce a second correlated target data, where the second correlated target data includes the new target data and updated known target data. The step of correlating 1024 the modified first correlated target data includes correlating the modified first correlated target data against both the updated known obstacle position data and the new target data from the obstacle model to produce the second correlated target data and updating 1022 the obstacle database 106 with a new obstacle position for the detected one or more targets. The method 1000 then removes 1026 the updated known target from the second correlated target data to produce a modified second correlated target data that includes the new target data without the known target data and the updated known target data.

In determination step 1028, the method 1000 determines 1028 if the new target data from the reflected RF signals is complete. If the new target data is not complete, the method 1000 includes adding 1030 the new target data to the obstacle model, identifying 1020 the type of obstacle from the new target data, updating 1032 the obstacle database 106 with the detected one or more targets that includes the new target data and type of obstacle for the one or more targets, correlating 1024 the modified first correlated target data against both the updated known obstacle position data and the new target data from the obstacle model to produce the second correlated target data, updating 1032 the obstacle database 1010 with a new obstacle position for the detected one or more targets, removing 1026 the updated known target from the second correlated target data to produce the modified second correlated target data, and again determining 1028 if the new target data from the reflected RF signals is complete. If the method 1000 determines 1028 that the new target data from the reflected RF signals is complete, the method 1000 provides 1034 the data to vehicle system and the method 1000 ends.

In this example, the step of performing radar processing on the plurality of reflected RF signals to the one or more targets includes performing, bistatic radar processing, monostatic radar processing, SAR processing, monostatic and bistatic radar processing, monostatic and SAR radar processing, bistatic and SAR radar processing, and monostatic, bistatic, and SAR radar processing.

In these examples, the obstacle database 106 may be an onboard database on a storage unit on the LWRS 100 that is similar to an automobile navigation system database that has initial data about the operating environment that is preloaded and is then updated as frequent as feasible via either wired or wireless networks prior to use. As such, the obstacle database 106 may already include most landmarks, hills, trees, buildings, and fixed obstacle location information prior to operation of the LWRS 100 and the onboard radar system and motion sensor then add to this existing data. This LWRS 100 may also include a radio capable of receiving in-flight data updates about external information of obstacles in the vicinity of LWRS 100 that appeared after the most recent update. This information could include data about, for example, construction cranes, new cellular network masts, water towers, radio towers, unexpected change in usual migratory route of birds, severe weather in the vicinity of the LWRS 100, locations of other UAVs in the area if they are being tracked or are providing real-time location information (from on-board GPS systems or other location systems), etc. In this example, the LWRS 100 may also include a GPS system and another radio system configured to broadcast its position for traffic control.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different examples of implementations has been presented for purposes of illustration and description, and is not intended to be exhaustive or limited to the examples in the form disclosed. Many modifications and variations will be apparent to those of ordinary skill in the art. Further, different examples of implementations may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

The invention claimed is:

1. A light-weight radar system ("LWRS") for sense and avoid applications in a vehicle, the LWRS comprising:
   a plurality of receivers;
   a plurality of transmitters;
   an obstacle database; and
   a processing device in signal communication with the plurality of receivers, the plurality of transmitters, and the obstacle database,
   wherein the processing device includes:
      a processor; and
      a computer-readable medium ("CRM") having encoded thereon computer-executable instructions to cause the processor to:
         transmit a plurality of transmit radio frequency ("RF") signals from the plurality of transmitters to one or more targets in an environment of operation of the LWRS;
         receive a plurality of reflected RF signals at the plurality of receivers from the one or more targets in the environment of operation;
         perform radar processing on the plurality of reflected RF signals to detect the one or more targets;
         update the obstacle database with the detected one or more targets; and
         provide obstacle data to one or more vehicle systems of the vehicle, and
   wherein the obstacle database and the processing device are configured to be carried on-board the vehicle.

2. The LWRS of claim 1, wherein performing radar processing on the plurality of reflected RF signals to detect the one or more targets includes performing:
   bistatic radar processing;
   monostatic radar processing;
   synthetic aperture radar ("SAR") processing;
   monostatic and bistatic radar processing;
   monostatic and SAR radar processing;
   bistatic and SAR radar processing; or
   monostatic, bistatic, and SAR radar processing.

3. The LWRS of claim 1, further including a motion sensor in signal communication with the processing device.

4. The LWRS of claim 1, wherein the plurality of receivers are arranged as a receive planar array antenna located within a first plane, and wherein the plurality of transmitters are arranged as a transmit planar array antenna located within a second plane.

5. The LWRS of claim 4, further including an additional receiver that is located in a position that is not within the first plane and an additional transmitter that is located in a position that is not within the second plane.

6. The LWRS of claim 4, further including:
   an additional receiver; and
   an additional transmitter,
   wherein the receive planar array antenna is a circular planar array,
   wherein the transmit planar array antenna is a circular planar array,
   wherein the additional receiver is located within the first plane at approximately a center of the receive planar array antenna, and
   wherein the additional transmitter is located within the second plane at approximately a center of the transmit planar array antenna.

7. The LWRS of claim 6, wherein the vehicle is an unmanned aerial vehicle.

8. A computer-implemented method for sensing and avoiding objects within an environment of operation with a light-weight radar system ("LWRS") in a vehicle, wherein the LWRS has a plurality of receivers, a plurality of transmitters, an obstacle database, and a processing device in the vehicle, the method comprising:
   transmitting a plurality of transmit radio frequency ("RF") signals from the plurality of transmitters to one or more targets in an environment of operation;
   receiving a plurality of reflected RF signals at the plurality of receivers from the one or more targets in the environment of operation;

performing, by the processing device, radar processing on the plurality of reflected RF signals to detect the one or more targets;

updating, by the processing device, the obstacle database with the detected one or more targets; and providing obstacle data to one or more vehicle systems of the vehicle.

9. The method of claim 8, wherein each transmit RF signal of the plurality of transmit RF signals is at a different frequency within a transmit bandwidth of frequencies, and wherein performing the radar processing including performing bistatic radar processing.

10. The method of claim 9, wherein performing the radar processing includes:

receiving retrieved obstacle data from the obstacle database;

calculating a model of predicted known targets, wherein the model of predicted known targets includes predicted known target data corresponding to known targets within the environment of operation;

correlating the plurality of reflected RF signals against the model of predicted known targets to produce a first correlated target data, wherein the first correlated target data includes known target data and new target data and wherein the known target data corresponds to the predicted known target data;

calculating updates for the model of predicted known targets from the first correlated target data to produce updated known obstacle position data having updated known target data;

removing the known target data from the first correlated target data to produce a modified first correlated target data that includes the new target data without the known target data;

correlating the modified first correlated target data against the updated known obstacle position data to produce a second correlated target data, wherein the second correlated target data includes the new target data and updated known target data;

removing the updated known target data from the second correlated target data to produce a modified second correlated target data that includes the new target data without the known target data and without the updated known target data;

determining if the new target data from the reflected RF signals is complete; and providing the obstacle data including the new target data to one or more systems of the vehicle.

11. The method of claim 10, wherein calculating updates for the model of predicted known targets includes:

updating the obstacle database with the known obstacle position data; and updating the model of predicted known targets with the known obstacle position data.

12. The method of claim 11, wherein removing the known target data from the first correlated target data to produce a modified first correlated target data includes:

adding the new target data to an obstacle model, wherein the obstacle model includes the new target data that corresponds the one or more targets detected from the reflected RF signals;

identifying a type of obstacle from the new target data; and updating the obstacle database with the detected one or more targets that includes the new target data and type of obstacle for the one or more targets.

13. The method of claim 12, wherein correlating the modified first correlated target data against the updated known obstacle position data to produce a second correlated target data includes:

correlating the modified first correlated target data against both the updated known obstacle position data and the new target data from the obstacle model to produce the second correlated target data; and updating the obstacle database with a new obstacle position for the detected one or more targets.

14. The method of claim 13, wherein calculating updates for the model of predicted known targets from the first correlated target data to produce updated known obstacle position data includes:

receiving motion data of the vehicle from a motion sensor in signal communication with the processing device; and calculating the model of predicted known targets utilizing the motion data.

15. The method of claim 13, wherein determining if the new target data from the reflected RF signals is complete includes:

if the new target data is not complete, adding the new target data to the obstacle model;

identifying the type of obstacle from the new target data;

updating the obstacle database with the detected one or more targets that includes the new target data and type of obstacle for the one or more targets;

correlating the modified first correlated target data against both the updated known obstacle position data and the new target data from the obstacle model to produce the second correlated target data;

updating the obstacle database with a new obstacle position for the detected one or more targets;

removing the updated known target data from the second correlated target data to produce the modified second correlated target data; and determining if the new target data from the reflected RF signals is complete.

16. The method of claim 15, wherein performing radar processing on the plurality of reflected RF signals to detect the one or more targets includes performing:

bistatic radar processing;

monostatic radar processing;

synthetic aperture radar ("SAR") processing;

monostatic and bistatic radar processing;

monostatic and SAR radar processing;

bistatic and SAR radar processing; or monostatic, bistatic, and SAR radar processing.

17. A non-transitory computer-readable storage medium storing instructions that, when executed by one or more processors that are on-board a vehicle and coupled to a plurality of receivers, a plurality of transmitters, and an obstacle database, cause the one or more processors to:

transmit a plurality of transmit radio frequency ("RF") signals from the plurality of transmitters;

receive a plurality of reflected RF signals at the plurality of receivers from one or more targets in an environment of operation;

perform radar processing on the plurality of reflected RF signals to detect the one or more targets;

update the obstacle database with the detected one or more targets; and provide obstacle data to one or more vehicle systems of the vehicle.

18. The non-transitory computer-readable storage medium of claim 17, wherein each transmit RF signal of the plurality of transmit RF signals is at different frequency within a transmit bandwidth of frequencies, and wherein the radar processing includes performing bistatic radar processing.

19. The non-transitory computer-readable storage medium of claim 17, wherein the radar processing includes:
   correlating the plurality of reflected RF signals against predicted known target data corresponding to known targets to produce first correlated target data, wherein the first correlated target data includes:
      known target data that corresponds to the predicted known target data; and
      new target data;
   producing modified first correlated target data that includes the new target data without the known target data;
   producing second correlated target data that includes the new target data and updated known target data; and
   removing the updated known target data from the second correlated target data to produce modified second correlated target data that includes the new target data without the known target data and without the updated known target data.

20. The non-transitory computer-readable storage medium of claim 17, wherein the instructions are further executable to cause the one or more processors to:
   receive motion data of the vehicle from a motion sensor; and
   calculate a model of predicted known targets utilizing the motion data.

* * * * *